(12) United States Patent
Pong (10) Patent No.: US 6,822,369 B2
(45) Date of Patent: Nov. 23, 2004

(54) PULSE PROPELLING FLAT INDUCTION MOTOR

(76) Inventor: Ta-Ching Pong, 5F, No. 8, Sublane 9, Lane 267, Pa Teh Rd., Sec. 2, Taipei (TW)

( * ) Notice: Subject to any disclaimer, the term of this patent is extended or adjusted under 35 U.S.C. 154(b) by 0 days.

(21) Appl. No.: 09/915,260

(22) Filed: Jul. 27, 2001

(65) Prior Publication Data

US 2003/0020363 A1 Jan. 30, 2003

(51) Int. Cl.[7] .......................... H02K 15/04; H02K 1/22; H02K 16/02
(52) U.S. Cl. ...................... 310/268; 310/68 R; 310/166
(58) Field of Search ................................ 310/166, 168, 310/261, 264, 268, 40 R, 68 B, 10

(56) References Cited

U.S. PATENT DOCUMENTS

| | | | | |
|---|---|---|---|---|
| 3,355,914 A | * | 12/1967 | Venema et al. ............. 310/268 |
| 3,564,307 A | * | 2/1971 | Kawabe et al. ............... 310/10 |
| 3,862,289 A | * | 1/1975 | Currell et al. ........... 264/272.2 |
| 3,867,656 A | * | 2/1975 | Mitsui et al. ............. 310/68 R |
| 4,028,573 A | * | 6/1977 | Terrone ..................... 310/217 |
| 4,081,726 A | * | 3/1978 | Brimer et al. ......... 318/207 A |
| 4,288,709 A | * | 9/1981 | Matthias et al. .......... 310/49 R |
| 4,677,334 A | * | 6/1987 | Finegold et al. ............ 310/268 |
| 4,691,133 A | * | 9/1987 | Mongeau .................... 310/178 |
| 4,798,986 A | * | 1/1989 | Smith, Jr. ................... 310/268 |
| 4,817,494 A | | 4/1989 | Cowan ........................... 89/8 |
| 4,829,205 A | * | 5/1989 | Lindgren .................... 310/166 |
| 4,831,300 A | * | 5/1989 | Lindgren .................... 310/190 |
| 4,866,321 A | * | 9/1989 | Blanchard et al. .......... 310/112 |
| 4,868,443 A | * | 9/1989 | Rossi ......................... 310/266 |
| 5,039,895 A | * | 8/1991 | Meister .................... 310/68 R |
| 5,117,141 A | * | 5/1992 | Hawsey et al. ............. 310/114 |
| 5,514,923 A | * | 5/1996 | Gossler et al. ................ 310/74 |
| 5,552,649 A | | 9/1996 | Cowan, Jr. et al. .......... 310/12 |
| 5,696,419 A | * | 12/1997 | Rakestraw et al. ......... 310/268 |
| 5,915,504 A | * | 6/1999 | Doricht ..................... 188/72.1 |
| 5,915,505 A | * | 6/1999 | Uhlig ....................... 188/73.37 |
| 5,921,354 A | * | 7/1999 | Evans ....................... 188/73.2 |
| 5,959,382 A | * | 9/1999 | Dauwalter ................. 310/90.5 |
| 6,161,660 A | * | 12/2000 | Suga et al. ........... 188/218 XL |
| 6,232,696 B1 | * | 5/2001 | Kim et al. ............. 310/156.37 |
| 6,244,391 B1 | * | 6/2001 | Bunker ...................... 188/18 A |
| 6,283,255 B1 | * | 9/2001 | Gardner et al. ........... 188/18 A |
| 6,342,769 B1 | * | 1/2002 | Birkestrand et al. ........ 318/139 |
| 6,472,784 B2 | * | 10/2002 | Miekka et al. ............ 310/68 R |
| 6,486,582 B1 | * | 11/2002 | Patarchi ...................... 310/166 |
| 6,509,663 B2 | * | 1/2003 | Laoun ................... 310/156.32 |
| 6,603,233 B2 | * | 8/2003 | Strohm ....................... 310/178 |

FOREIGN PATENT DOCUMENTS

JP          10191603 A  *  7/1998  .......... H02K/17/02

OTHER PUBLICATIONS

Brembo High Performance FAQ's, http://hp.brembo.com/edit/faq/index.asp.*

Harry D. Fair, Jr., "Electromagnetic Propulsion: A New Initiative", IEEE Transactions On Magnetics, vol., MAG–18, No. 1; Jan. , 1982; pp. 4–6 with contents page.

Peter Mongeau and Fred Williams, "Arc–Commutated Launcher"; IEEE Transactions On Magnetics, vol. MAG–18, No. 1; Jan. 1982; pp. 42–45.

(List continued on next page.)

Primary Examiner—Joseph Waks
Assistant Examiner—Pedro J. Cuevas
(74) Attorney, Agent, or Firm—Bacon & Thomas, PLLC (57) ABSTRACT

An induction motor for the conversion of electrical energy into mechanical energy is integrated with a wheel system or brake system of a transportation apparatus, ane especially human powered apparatus.

15 Claims, 11 Drawing Sheets

OTHER PUBLICATIONS

T.J. Burgess, E.C. Cnare, W.L. Oberkampf, S.G. Beard and M. Cowan; "*The Electromagnetic θ Gun and Tubular Projectiles*"; IEEE Transactions On Magnetics, vol. MAG–18, No. 1; Jan., 1982; pp. 46–59.

William R. Snow, R. Scott Dunbar, Joel A. Kubby and Gerard K. O'Neill; "*Mass Driver Two: A Status Report*"; IEEE Transactions On Magnetics, vol. MAG–18, No. 1, Jan. 1982; pp. 127–134.

Henry Kolm and Peter Mongeau; "*Basic Principles Of Coaxial Launch Technology*"; IEEE Transactions On Magnetics, vol. MAG–20, No. 2, Mar. 1984; pp. 227–231.

Kenelm McKinney and Peter Mongeau; "*Multiple Stage Pulsed Induction Acceleration*"; IEEE Transactions On Magnetics, vol. MAG–20, No. 2, Mar. 1984; pp. 239–242; Cambridge, MA.

* cited by examiner

Fig. 8 A typical HPV with active propelling wheel

PULSE PROPELLING FLAT INDUCTION MOTOR

BACKGROUND OF THE INVENTION

In vehicles with passive wheels driven by a conventional electric motor, and powered by a hybrid internal combustion engine (ICE), electricity generator battery or, even more recently, fuel cells, the electrical energy available for the application is typically limited.

Also, with the existing technology, the weight of the vehicle body, the electrical energy storage/generation, and the related drive train heavily influences the duration or the total distance that user can travel with one single "re-fuel" or "re-charge".

SUMMARY OF THE INVENTION

The fossil fuel internal combustion engine has long being tagged as the primary source of environmental pollution. Present time human achievements have been seriously threatened by a situation as the global warming, as is becoming more apparent due to the frequency of "El Niño" and other climate changes. Although different technology has been developed since the first oil crisis, concern about the extinction of precious global resources has recently sped up the development of electrical vehicle (EV). Different technology combinations have been in trial for such a long time that we finally can see some EVs becoming commercially available.

Figure 102:
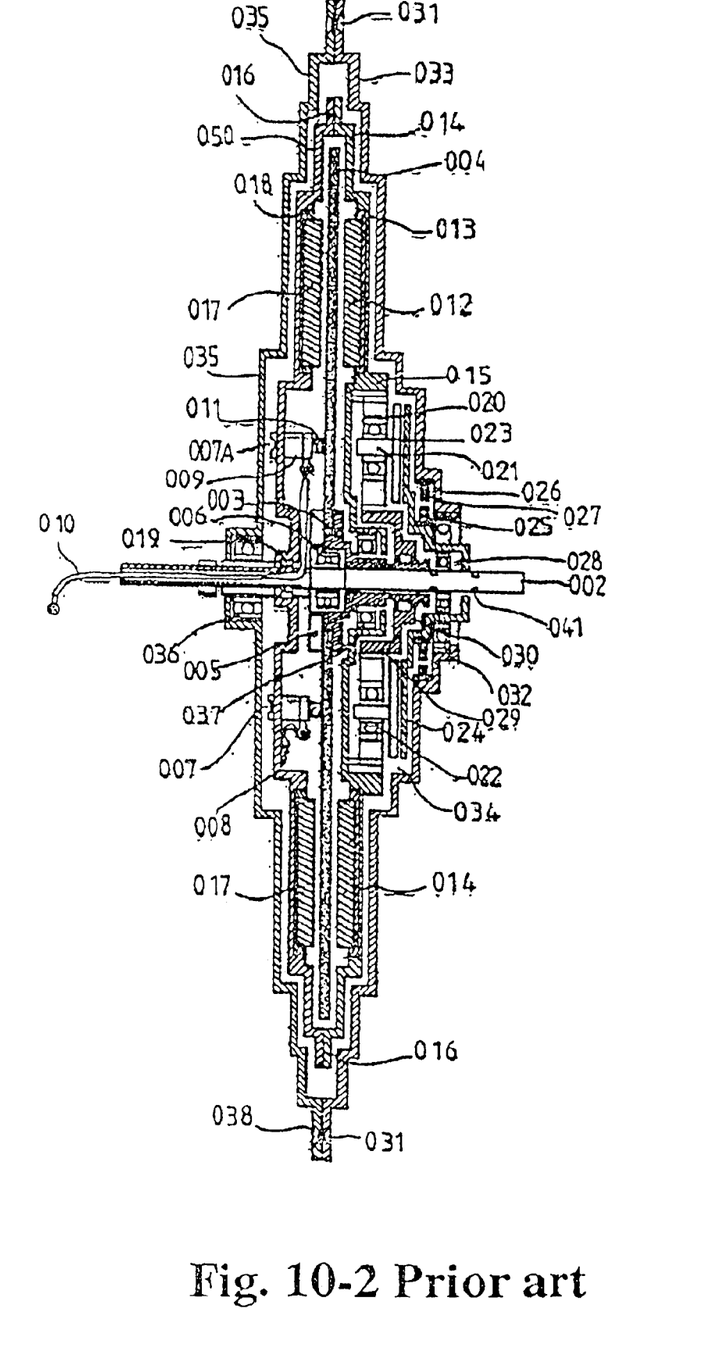

However, the existing electrical motor design has limited the basic design approach that is used. A gear box and power drive train for converting the energy generated by the electrical motor into mechanical driving force is typical in an EV design. The improvement of the total distance that can be traveled with existing electrical motors and drive train technology is seriously limited. The complexity involved with the existing drive train and motor design makes it a target for improvement. Nevertheless, although some novel motor designs (FIG. 10-2) have been proposed that can be used as part of the wheel in a HPV (human power vehicle) so that the extra drive train can be eliminated, it has heretofore been impractical to eliminate the drive train in an EV.

Figure 101:
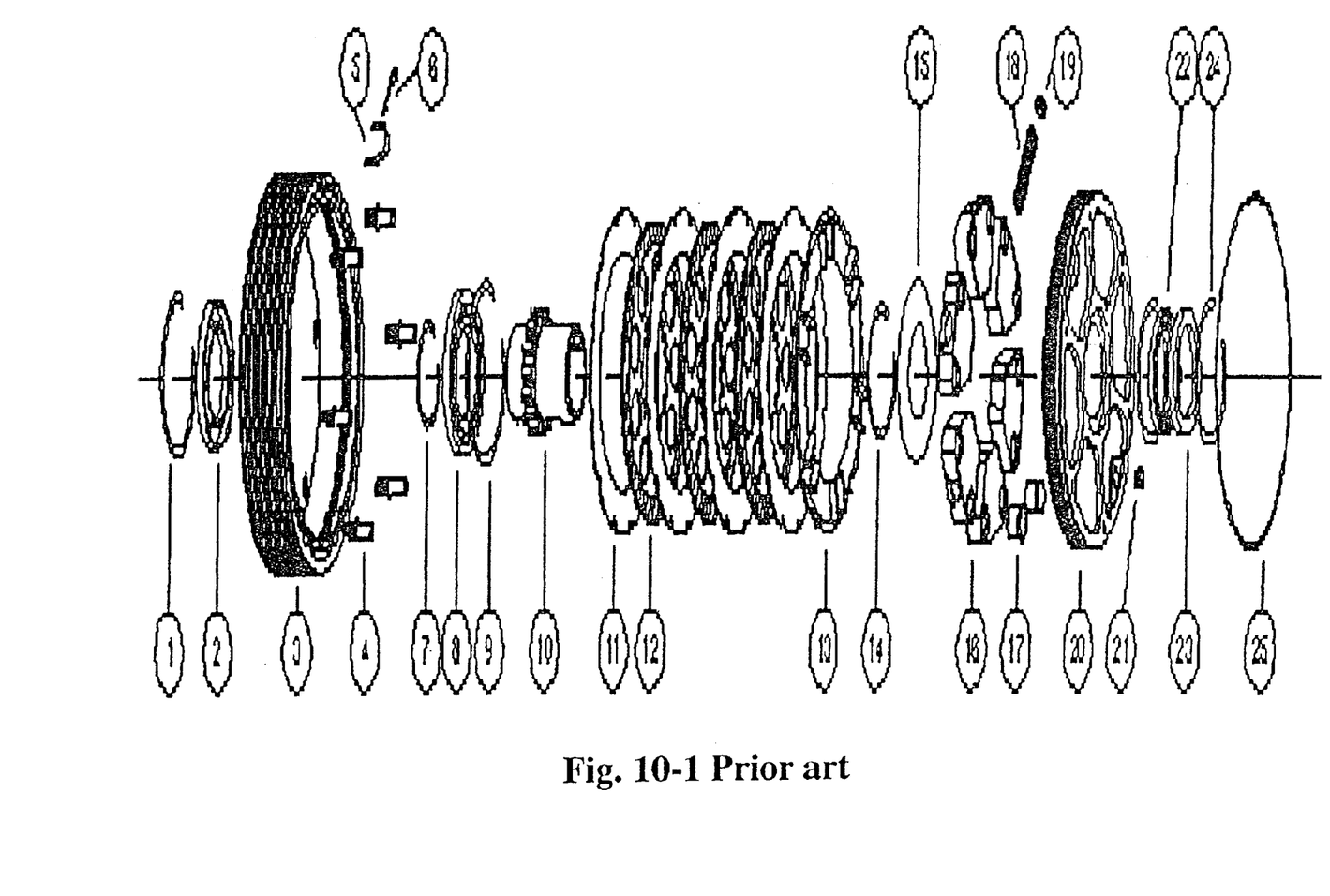

Powerful, efficient and yet robust technology is required for EV applications, since EVs are to be used in the same environment as the existing ICE vehicles. It is the objective of this invention to improve such a situation with a solid robust motor design that can be built as part of the wheel structure module of the existing ICE vehicle design. With such an active propelling wheel drive, the design can be easily implemented on any vehicle. As indicated via one embodiment of the prior art as shown in FIG. 10-1, the concept of a clutch device that can be used in a drive train can be applied together with the embodiment of the present invention. The conventional gear box and drive train can be completely re-designed. The total weight of a vehicle can be greatly reduced and superior drive efficiency can easily be implemented with the digital electronic technology that is available now.

The Flat Induction Motor (FIM) mentioned herein is a compact, flat induction motor offering a unique capability for load propulsion. It is an application of the technology developed for the electromagnetic launcher designed to accelerate projectiles. Pairs of closely spaced electrical coil windings, installed and firmly fixed on the vehicle structure, straddle a segmented core block. The current is pulsed as the coils cross an edge of one segment of the core block. This induces surface currents that repel the core block so that, in essence, the pulsed coils push off the segment edges.

When applied as an electromagnetic propulsion system for parts of an apparatus, such as the active wheels of a vehicle, the apparatus has less weight to be driven by the electrical energy that is available, electromagnetic braking can be used, and, relieved of the need to transmit power through drive train traction, the vehicle can be designed to provide more mileage per "re-fuel" or "RE-CHARGING".

BRIEF DESCRIPTION OF THE DRAWINGS

FIGS. 10-1, 10-2 illustrating a typical prior art clutch device and a typical motor designed for HPV.

REFERENCES

U.S. Pat. Nos. 4,817,494 and 5,552,649.

IEEE Transactions On Magnetics, vol. MAG-18, No. 1, 01/82:
 (1) Fair, Harry Jr., "Electromagnetic Propulsion: A New Initiative", pp. 4–6;
 (2) Mongeau & Williams, Arc-Commutated Launcher, pp. 42–45;
 (3) Burgess, Cnare, Oberkampf, Beard & Cowan, The Electromagnetic theta. Gun and Tubular Projectiles, pp. 46–59;
 (4) Snow, Dunbar, Kubby, O'Neill, Mass Driver Two: A Status Report pp. 127–134.

IEEE Transactions On Magnetics, vol. MAG-20, No. 2, 3/84:
 (1) Kolm & Mongeau, "Basic Principles of Coaxial Launch Technology", pp. 227–230
 (2) Burgess & Cowan, Multistage Induction Mass Accelerator pp. 235–238
 (3) McKinney and Mongeau, Multiple Stage Pulsed Induction Acceleration, pp. 239–242.

DETAILED DESCRIPTION OF THE PREFERRED EMBODIMENTS

Figure 1A:
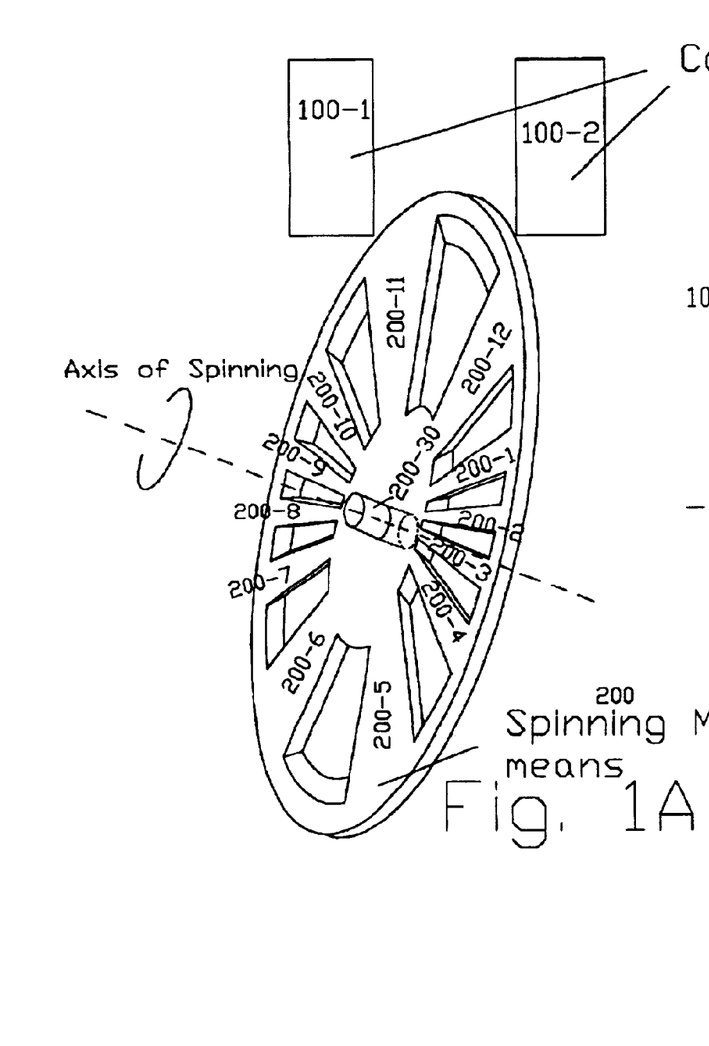
FIGS. 1A and 1B are perspective views of an embodiment of the invention, indicating the relationship between the metal core means and the coil module means.
Figure 1B:
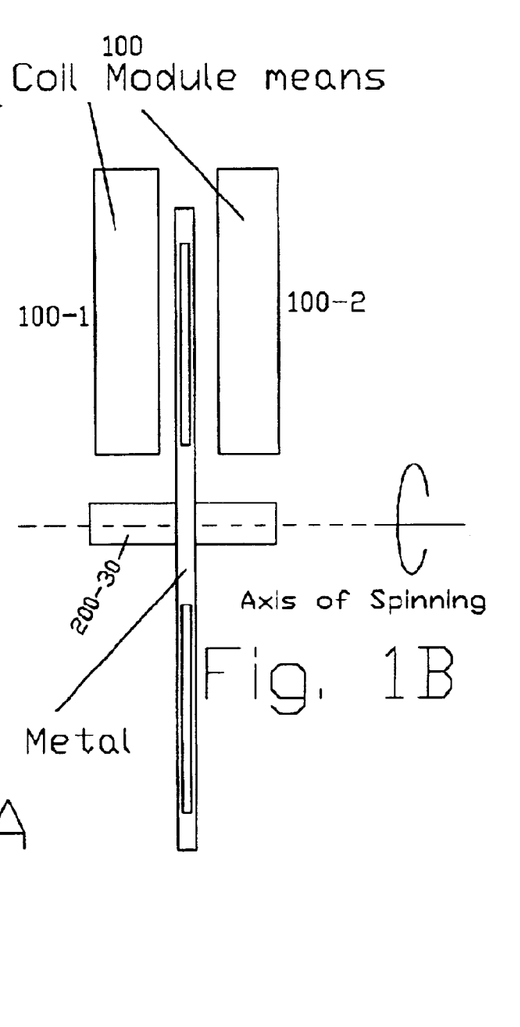

As shown in FIG. 1A, a first preferred embodiment of the invention includes a thick sheet metal core means 200 made of material such as Aluminum or Copper, that is formed as a fan type disc with a number of holes 200-1, -2, -3, ..., -12 in it. Such a metal disc forms the rotor of a flat induction motor. FIG. 1 B shows the same design but from a different perspective.

Additional stationary coil block can be seen in FIG. 1A, the number of coil module means 100 can be determined by the amount of thrust and complexity of design desired. The coil module means 100-1, -2, ... can be mounted to follow the circular shape of the metal disc. (see also, FIG. 8) In FIGS. 1A, 1B, only 2 coil module means are shown. According to the principles of the invention, the coil module means 100 produces pulsed magnetic field that will be peak in strength depending on the relative position of the metal core means and the coil module means. When the metal portion 200-1, -2, -3, ..., -12 of the metal core means passes through the suitable position in relation to the coil's position, the current in the coil is pulsed on/off to provide the driving force so that the metal core means is caused to rotate.

The metal portion that acts as the rotor's driving part can also serve as the spoke of the wheel structure in order to minimize the weight of the motor. The design of the wheel structure using this invention remains very much like the existing one, so minimum changes are required in order to adapt conventional wheel manufacture to produce the rotor of the invention. Even multiple metal bars can be assembled onto a hub and rim so that the metal portion can serve the same purpose of the above mention design. Yet another application can be designed so that the present invention serves as part of the hub or rim of the wheel design.

Figures 2A, 2B:
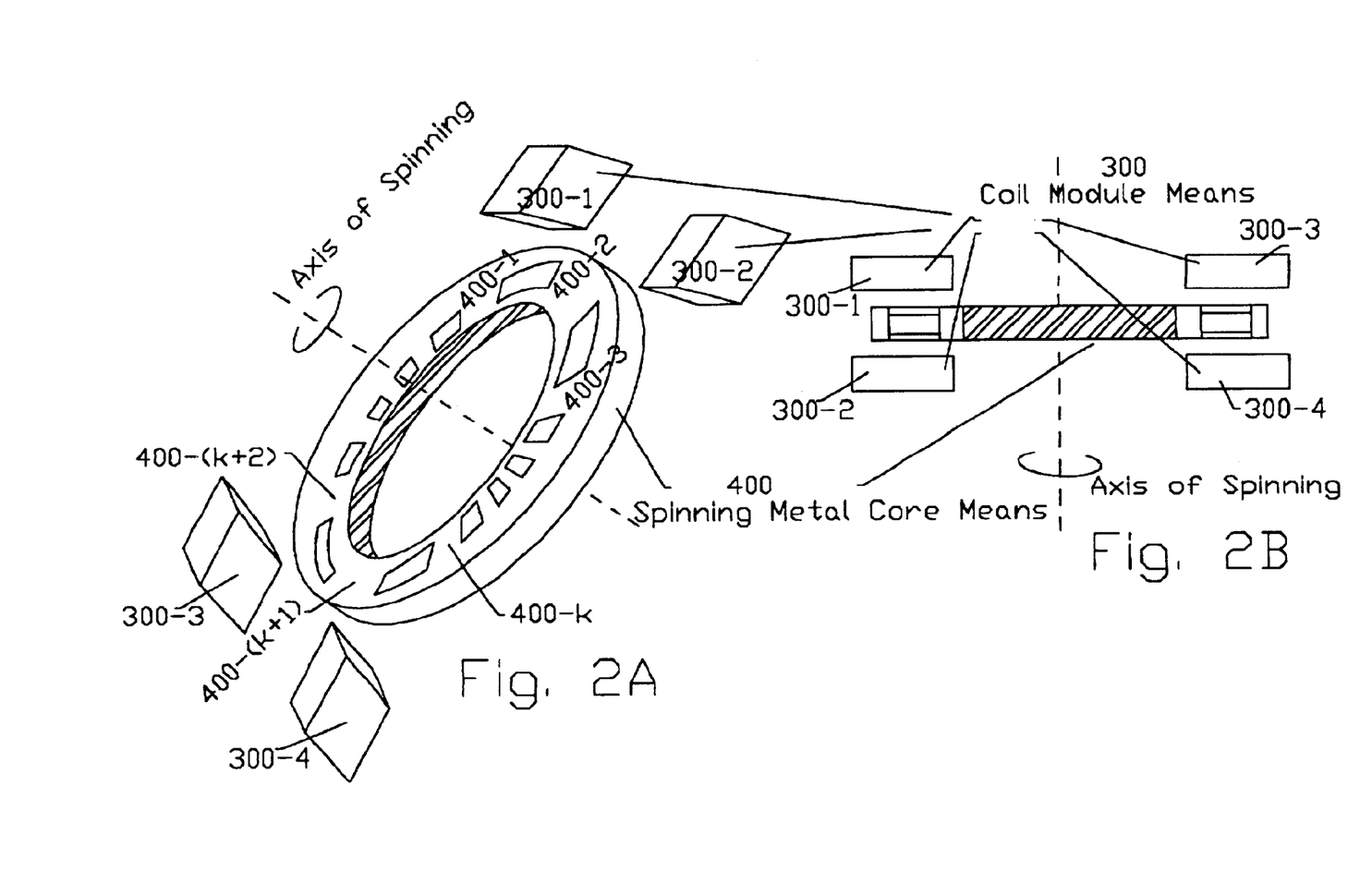
FIGS. 2A and 2B are perspective views of another embodiment, indicating a change in the design of the metal core means and the coil module means.

FIG. 2 shows another type embodiment similar to that of FIG. 1, but in which the center of rotation or axis is no longer necessary as in the traditional motor design. The bearing or fixation of the rotor can now be implemented along either the outer circle or the inner circle of the donut shaped rotor. The above design can also be used as a replacement of the metal disc that is used in present day's vehicle's brake disc, as can be seen in a modern vehicle design.

Figures 3A, 3B, 3C:
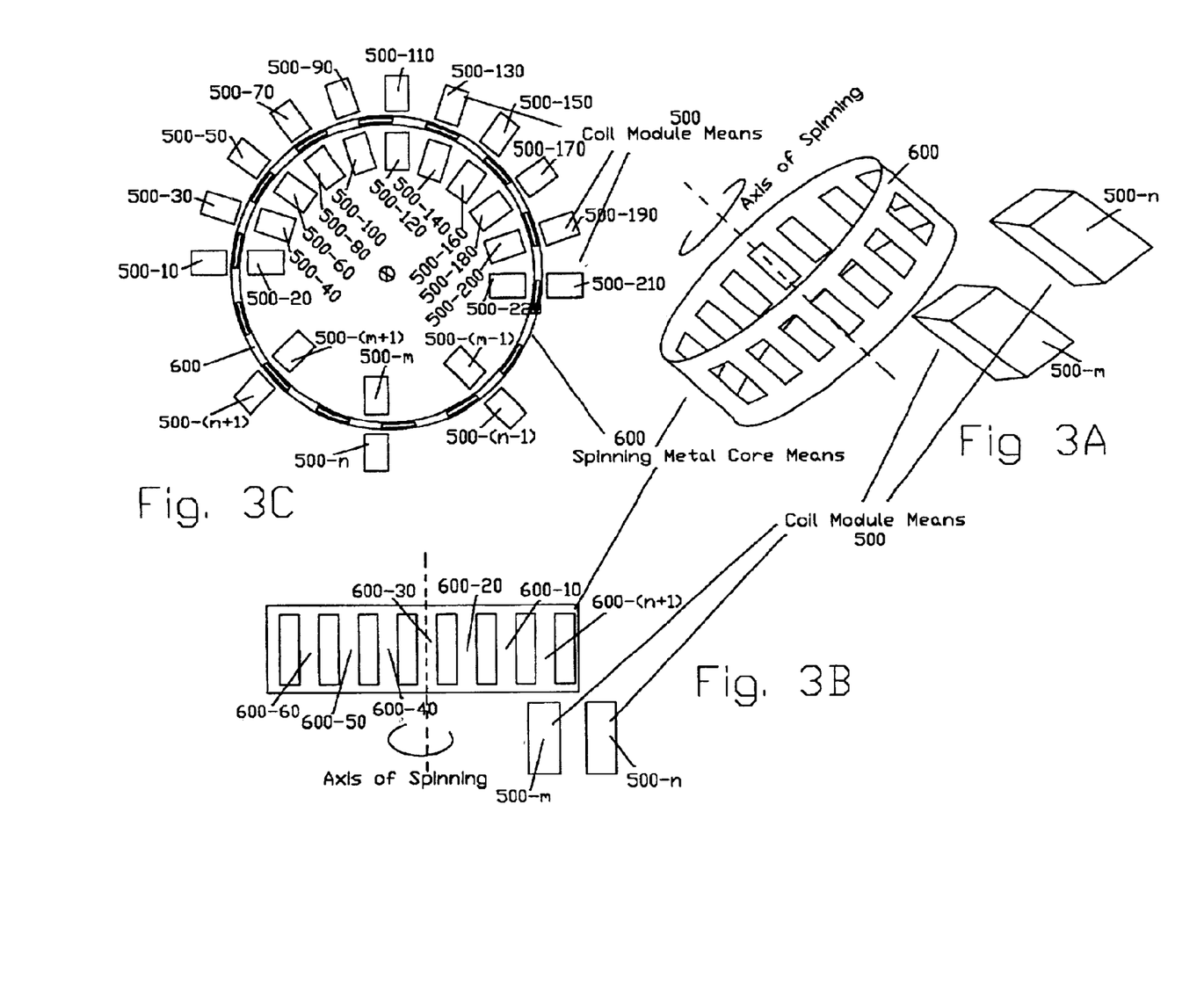
FIGS. 3A, 3B and 3C are perspective views of still another embodiment, indicating a further change in the design of the metal core means and the coil module means.

FIG. 3 is another typical embodiment. Here the metal core means 600 is being arranged as a metal strip bent into a circular shape. Slots formed in the metal strip serve to define discrete metal portions 600-10, -20, -30, -40, -50, -60, ..., -(n+1). As the original driving principle teaches, the number of coil module means 500 can be determined based on the driving force needed and the complexity that can be used.

The bearing or fixation of the rotor of this embodiment can also be implemented along either the outer circle or the inner circle of the duct shaped rotor. FIGS. 3A & B shows only one pair of coil module means 500-n and 500-m, but in FIG. 3C, a plurality coil module means 500-10, -20, -30, -(n-1), -n, -(n+1), ..., -(m-1), -m, -(m+1) sets is shown.

Figures 4A, 4B:
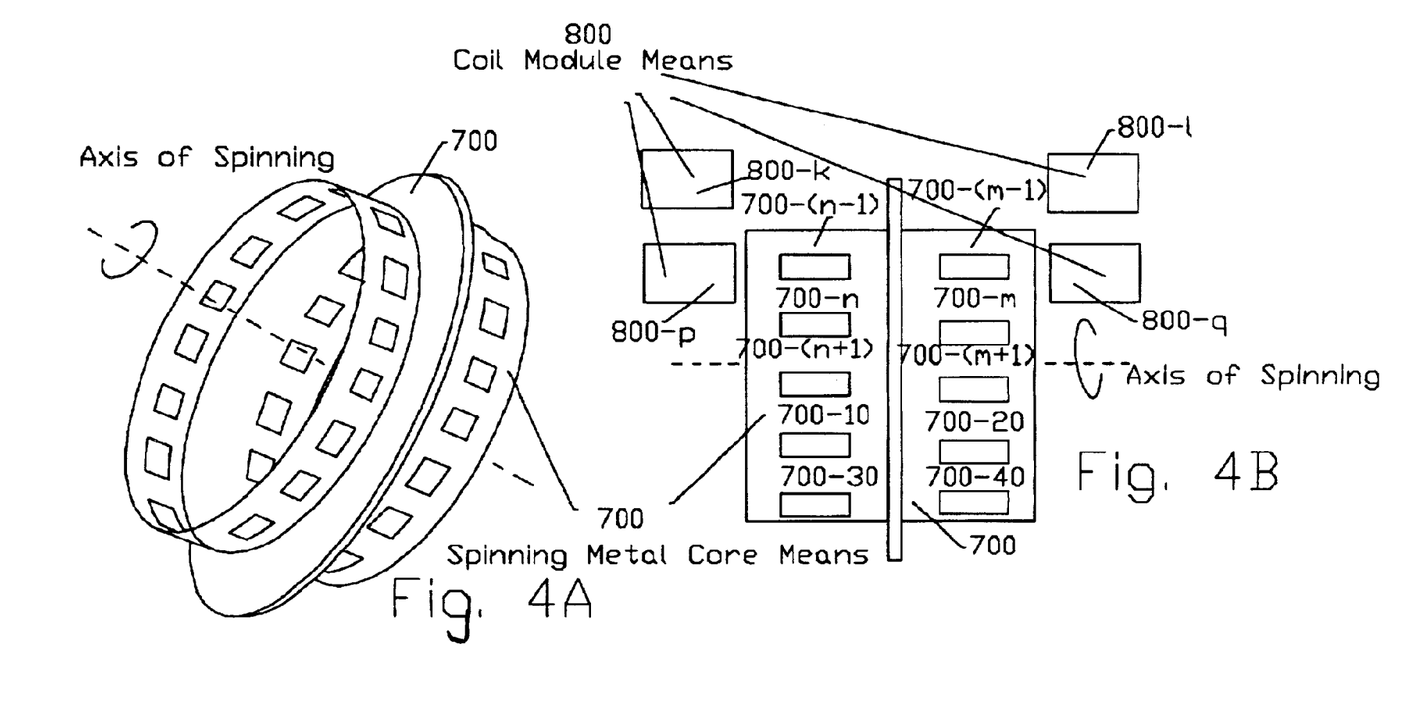
FIGS. 4A and 4B are perspective views of yet another embodiment, indicating another change in the design of the metal core means and the coil module means.

FIG. 4 shows another similar design that can be used. The bearing or fixation of the rotor can now be implemented along either the outer circle or the inner circle of the duct shaped rotor. With suitable mechanical design modification and integration, the existing wheel system can be modified to incorporate the present invention so that minimum changes are necessary to the existing mechanical system.

Components with different dimensions and shapes can be employed without deviating from the intention of the invention. The above mentioned embodiment is listed merely to demonstrate a particular embodiment of the invention and should not become a limitation to the claims of the invention.

With the present invention, an HPV can be designed so that the flat induction motor will serve as an active propelling wheel with much less extra weight added to the HPV. Since the HPV is usually started with human effort, the start up of the flat induction motor will usually be made after the HPV is up and running, which will make the present invention an even more attractive propelling tool since no extra kick start mechanism is required.

Should initial'start up be needed, however, a minimum extra weight is needed in the form of a suitable starter and cluch to implement a kick start up device. Such a start up device can be implemented with 2–3 different motors, including such that a first suitable flat induction motor is driven by a third small motor to start up with, and when the first flat induction motor reaches suitable driving status, it can be clutched with yet another flat induction motor, which serves as the main driving motor of the vehicle.

Figure 5A:
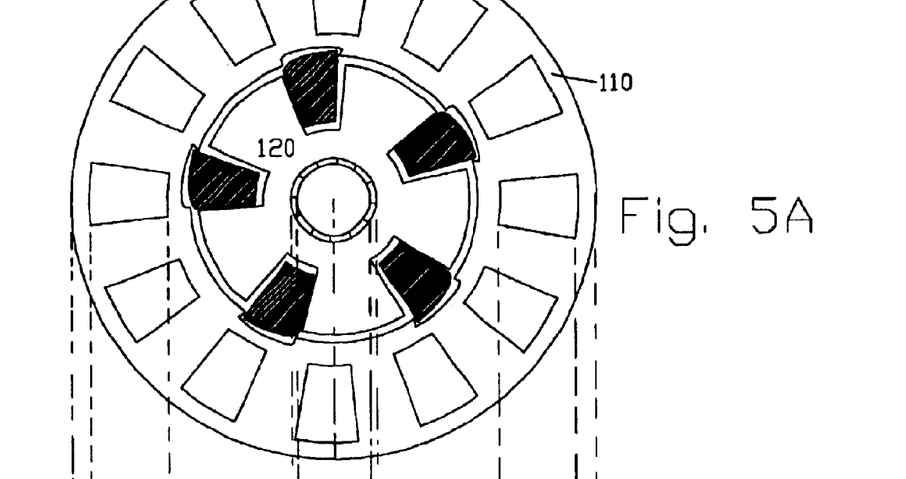
FIGS. 5A, 5B and 5C indicate an embodiment that employs a mechanical clutch and extra driving motors to initiate motor running.
Figure 5B:
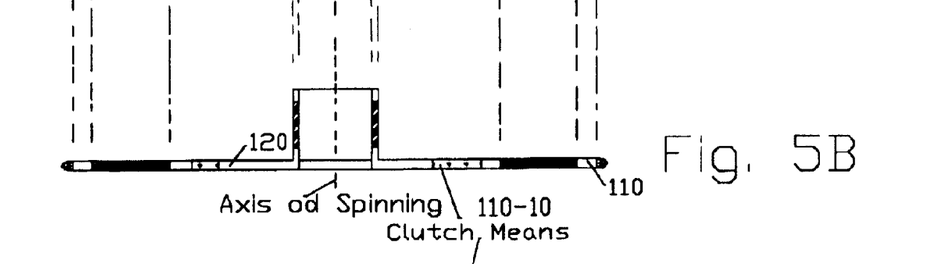
Figure 5C:
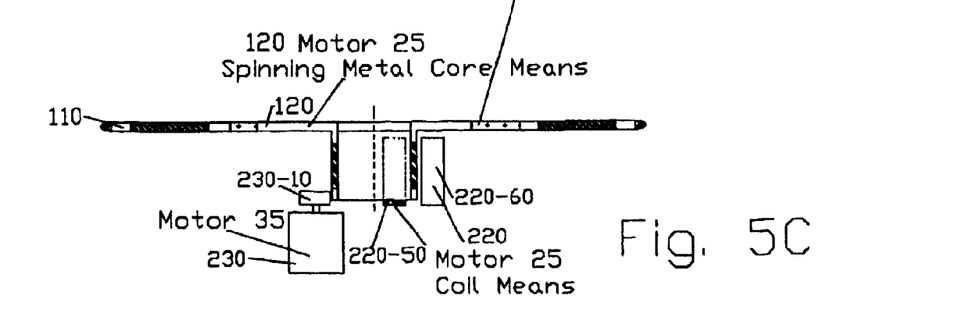

The wheel and related load 110 are driven by first flat induction motor 25 (120) via any combination including a suitable clutching device such as the clutching mechanism 110-10 shown in FIG. 5. Due to the use of clutching device 110-10, the second motor 35 (230) together with its related driving mechanism 230-10, such as a pulley, belt, gear, chain or the like, can be used to start the rotation of the relatively lightly loaded metal core means of the said first flat induction motor 25.

When the first flat induction motor 25 has reached its thrust momentum, a suitable mechanical means can be employed to clutch the first flat induction motor 25 so that it will now be able to drive the wheel and related load 110, which is linked to the mass of the vehicle body.

Figures 6A, 6B:
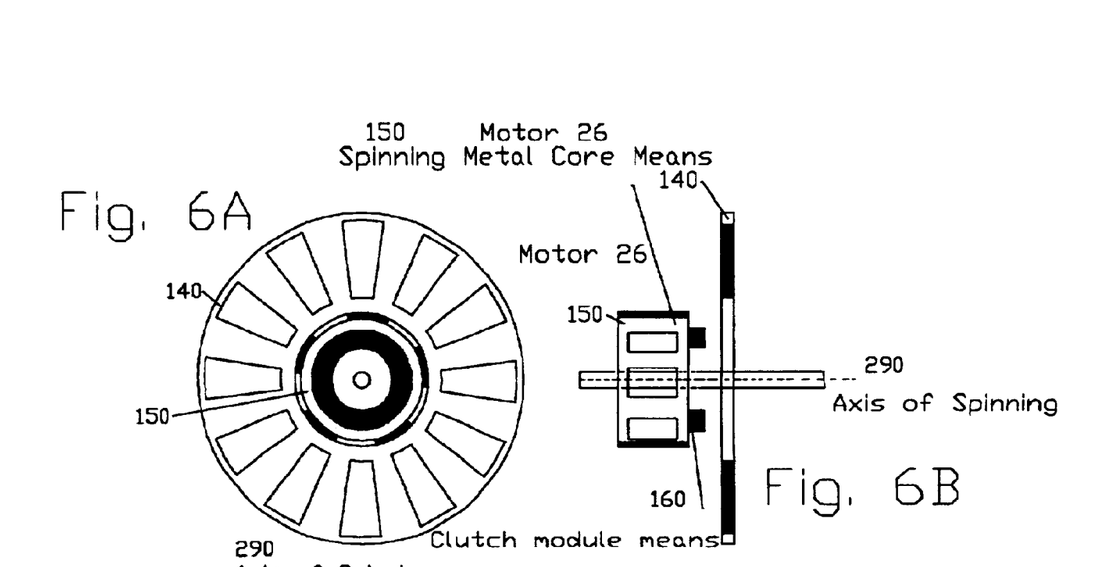
FIGS. 6A, 6B and 6C indicate another embodiment that employs a mechanical clutch and extra driving motors to initiate motor running.
Figure 6C:
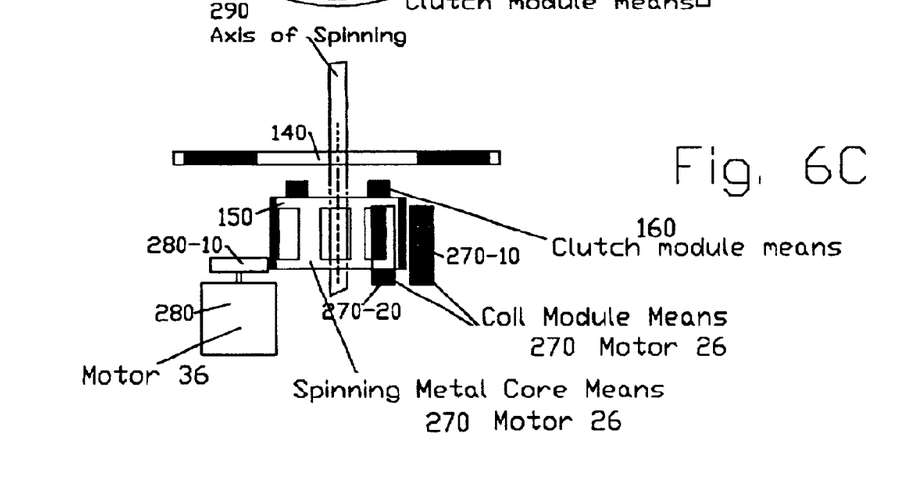

In FIG. 6, the wheel and related load 140 are driven by the first flat induction motor 26 (150) via any suitable clutching device or mechanism. A typical clutching mechanism 160 is shown in FIG. 6. Due to the use of clutching device 160, the second motor 36 (280) together with its related driving mechanism 280-10, which may be a pulley, belt, gear, chain or the like, can be used to start the rotation of the relatively lightly loaded first flat induction motor 26 (150). When the first flat induction motor 26 has reached its thrust momentum, suitable mechanical means can be employed to make the clutch the first flat induction motor 26 so that it will now be able to drive the said wheel and related load 140, which is linked to the mass of the vehicle body. As described earlier, the coil module means 270 may be arranged to fit the mechanical design.

Figures 7A, 7B, 7C:
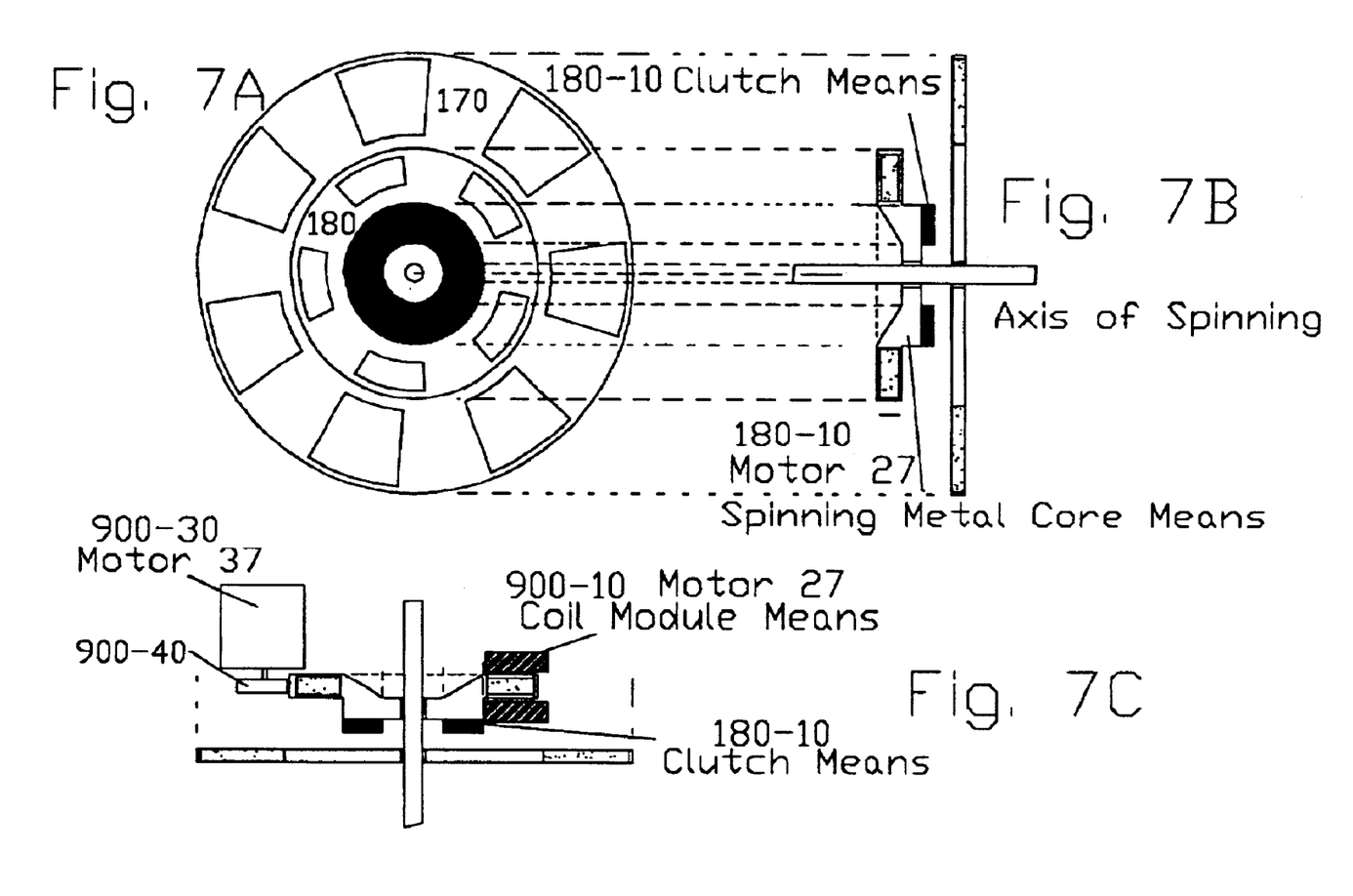
FIGS. 7A, 7B and 7C indicate yet another embodiment that employs a mechanical clutch and extra driving motors to initiate the motor running.

FIG. 7 shows yet another embodiment that can be used for such a kick start up device. In FIG. 7, the wheel and related load 170 are driven by the first flat induction motor 27 (180) via any suitable clutching device, such as clutching mechanism 180-10. Due to the use of clutching device 180-10, the second motor 37 (900-30) together with its related driving mechanism 900-40, which may be a pulley, belt, gear, chain or the like, can be used to start the rotation of the relatively lightly loaded said first flat induction motor 27. 25 When the first flat induction motor 27 has reached its thrust momentum, suitable mechanical means can be employed to engage the first flat induction motor 27 so that it will now be able to drive the wheel and related load 170, which is linked to the mass of the vehicle body. As described earlier, the coil module means 900-10 is arranged to fit the mechanical design.

The various alternative embodiments of the start up mechanism should of course not be taken as limiting the present invention, but rather only serve as illustrative examples of the invention.

Figure 8:
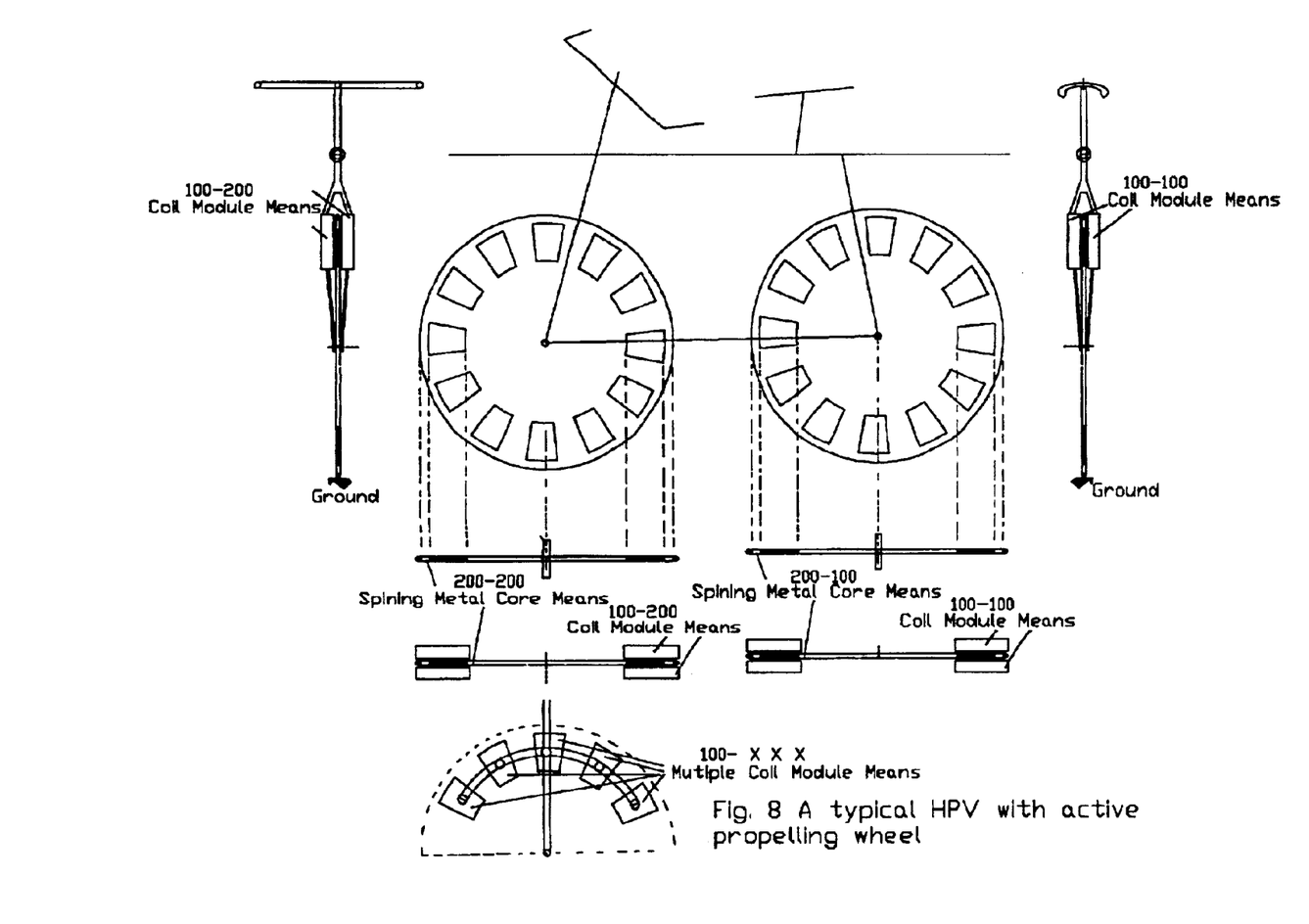
FIG. 8 illustrates a typical HPV with active propelling wheel.

FIG. 8 illustrates a typical embodiment of the invention in an HPV situation. The flat induction motor can be mounted on either one wheel or both wheels. In FIG. 8, the metal core means 200-100, 200-200 of the flat induction motor can be implemented as either the spoke, part of the rim, or part of the hub. While the coil module means 100-100, 100-200 can also be arranged as a plurality of pairs, 100-XXX. The relative positions of the coil module means 100-XXX can be arranged to fit the shape of wheel structure.

Again, the details of the mechanical or electrical design can be dependent on the purpose of the vehicle. The plurality of alternative embodiments should not be taken as a limitation of the present invention, but rather only serve as illustrative examples.

Figures 9A, 9B, 9C:
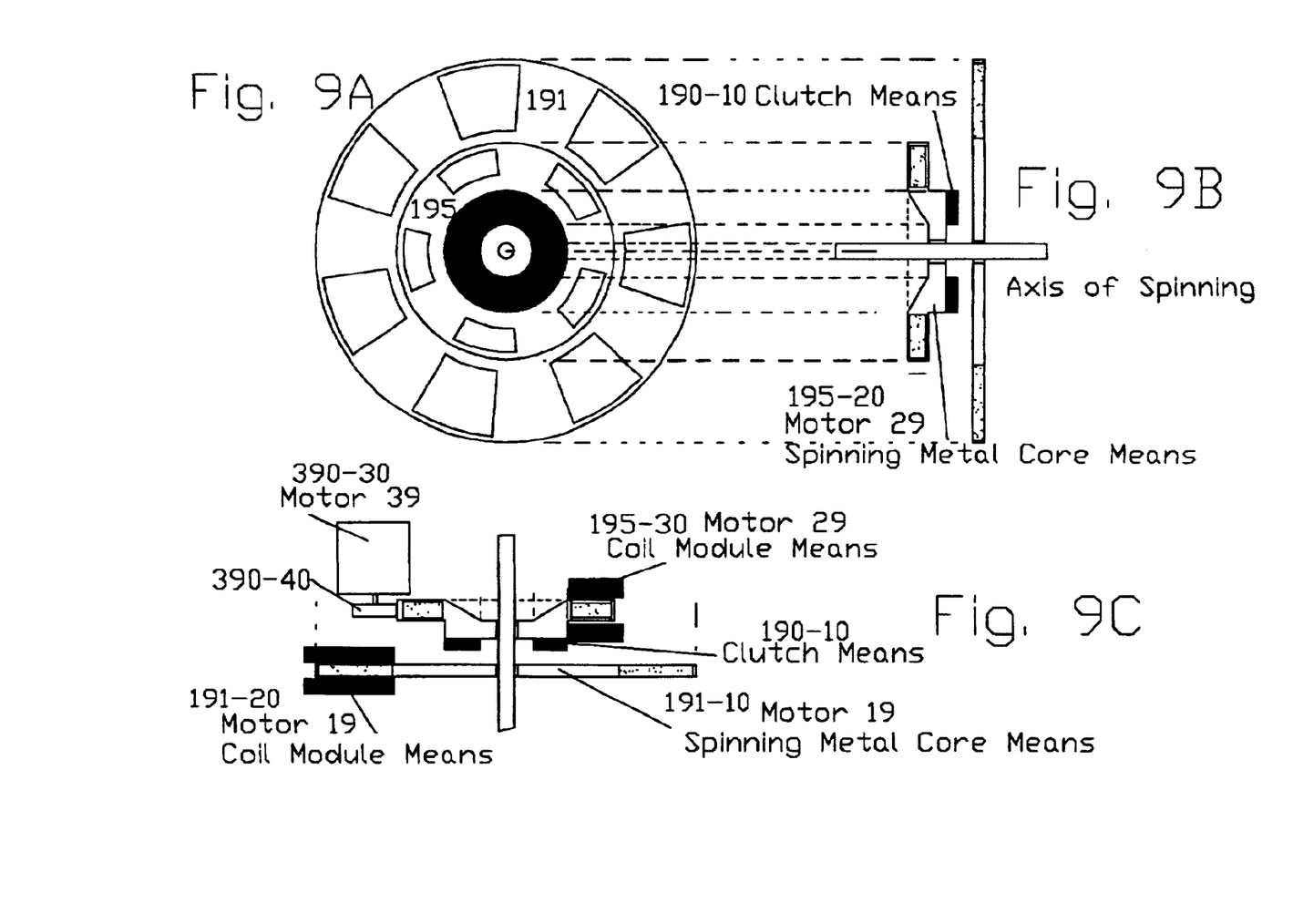
FIGS. 9A, 9B and 9C indicate an embodiment that employs a mechanical clutch and extra driving motors to initiate motor running.

FIG. 9 shows yet another embodiment that can be used in connection with a kick start up device. In FIG. 9, the second flat induction motor 19 (191) will be driven by the first flat induction motor 29 (195) via any suitable clutching device, such as the typical clutching mechanism 190-10 shown in FIG. 9. Due to the use of clutch 190-10, the third motor 39 (390-30) together with a related driving mechanism 390-40 such as a pulley. belt, gear, chain or the like, can be used to start the rotation of the relatively lightly loaded first flat induction motor 29. When the first flat induction motor 29 has reached its thrust momentum, suitable mechanical means can be employed to clutch the first flat induction motor 29 so that it will now be able to drive the second flat induction motor 191 as necessary, which is spun around the axis of rotation of the motor. The second flat induction motor 19 (191) is linked to the mass of the vehicle body and will be the main driving energy source for the vehicle. As described earlier, the coil module means 191-20, 195-30 are arranged to fit the suitable mechanical design.

Those skilled in the art will appreciate that the alternative embodiments of the start up mechanism described of should not be limited and that they only serve to illustrate the principles of the invention. In addition, it is again noted that the details of the mechanical or electrical design can be dependent on the purpose of the vehicle.

What is claimed is:

1. A flat induction motor for driving a part of an apparatus, comprising:
   a disc-shaped flat metal rotor including two axially opposite principal surfaces and a plurality of slots that extend into at least one of the principal surfaces and that are distributed around a single axis of rotation of the rotor in a generally circular configuration, said rotor being arranged to rotate around the single axis of rotation;
   a stator including a plurality of coil means positioned near the rotor to cause rotation of the rotor by magnetic interaction therewith;
   energy controlling commutation means for controlling driving of the rotor by:
      detecting a position of said slots in order to detect a position of said rotor relative to said coils, and
      causing current to pass through said coil means based on the detected position of said slots,
   wherein said rotor is the part of the apparatus to be driven by the motor.

2. The flat induction motor of claim 1, wherein said coil means is positioned along the side of metal parts of said rotor, in a circular configuration, or along at least a portion of the periphery of the motor.

3. The flat induction motor of claim 1, wherein said parts of said rotor form at least one spoke, a part of the hub or rim of a wheel of a vehicle.

4. The flat induction motor of claim 1, wherein said rotor is a part of a brake system for a wheel of a vehicle.

5. A flat induction motor for driving a part of an apparatus, comprising:
   a flat metal induction rotor comprising a metal plate bent into a circular shape and including axially-opposite principal surfaces and a plurality of slots that extend into at least one of the principal surfaces and that are distributed around the rotor, said rotor being arranged to rotate around a single axis of rotation;
   a stator including a plurality of coil means positioned near the rotor to cause rotation of the rotor by magnetic interaction therewith;
   energy controlling commutation means for controlling driving of the rotor by:
      detecting a position of said slots in order to detect a position of said rotor relative to said coils, and
      causing current to pass through said coil means based on the detected position of said slots,
   wherein said rotor is the part of the apparatus to be driven by the motor.

6. The flat induction motor of claim 5, wherein said coil means is positioned along the side of metal parts of said rotor, in a circular configuration, or along at least a portion of the periphery of the motor.

7. The flat induction motor of claim 5, wherein said parts of said rotor form a part of the hub or a part of the rim of a wheel of a vehicle.

8. The flat induction motor of claim 5, wherein said rotor is a part of a brake system for a wheel of a vehicle.

9. A flat induction motor for driving a part of an apparatus, comprising:
   a flat metal induction rotor comprising a metal plate having a ring shape and including
   a plurality of slots that extend into the rotor and that are distributed around the rotor, said rotor being arranged to rotate around a single axis of rotation;
   a stator including a plurality of coil means positioned near the rotor to cause rotation, and control a speed, of the rotor by magnetic interaction therewith;
   energy controlling commutation means for controlling driving of the rotor by:
      detecting a position of said slots in order to detect a position of said rotor relative to said coils, and
      causing current to pass through said coil means based on the detected position of said slots,
   wherein said rotor is the part of the apparatus to be driven by the motor.

10. The flat induction motor of claim 9, wherein said coil means is positioned along the side of metal parts of said rotor, in a circular configuration, or along at least a portion of the-periphery of the motor.

11. The flat induction motor of claim 9, wherein said parts of said rotor form at least a part of the hub or rim of a wheel of a vehicle.

12. The flat induction motor of claim 9, wherein said rotor is a part of a brake system for a wheel of a vehicle.

13. The flat induction motor of claim 1, wherein said slots extend completely through said rotor.

14. The flat induction motor of claim 5, wherein said slots extend completely through said rotor.

15. The flat induction motor of claim 9, wherein said slots extend completely through said rotor.

* * * * *